(12) United States Patent
Fan

(10) Patent No.: US 9,496,642 B1
(45) Date of Patent: Nov. 15, 2016

(54) CHARGING CONNECTOR HAVING A BODY WITH A MAGNETIC MEMBER

(71) Applicant: Eagle Fan, Hsinchu (TW)

(72) Inventor: Eagle Fan, Hsinchu (TW)

( * ) Notice: Subject to any disclaimer, the term of this patent is extended or adjusted under 35 U.S.C. 154(b) by 0 days.

(21) Appl. No.: 15/078,050

(22) Filed: Mar. 23, 2016

(51) Int. Cl.
*H01R 13/60* (2006.01)
*H01R 13/62* (2006.01)
*H01R 13/22* (2006.01)

(52) U.S. Cl.
CPC .......... *H01R 13/6205* (2013.01); *H01R 13/22* (2013.01)

(58) Field of Classification Search
CPC ... H01R 11/30; H01R 13/60; H01R 13/6205
USPC ...................................... 439/38–40
See application file for complete search history.

(56) References Cited

U.S. PATENT DOCUMENTS

| | | | | |
|---|---|---|---|---|
| 7,351,066 B2* | 4/2008 | DiFonzo | ............. | H01R 13/641 439/39 |
| 8,016,600 B2* | 9/2011 | Li | ........................ | H02J 7/0032 439/39 |
| 8,187,013 B2* | 5/2012 | Saito | ..................... | H04N 5/2251 439/218 |
| 8,596,881 B2* | 12/2013 | Umeno | ................ | G02B 6/3817 385/53 |
| 9,172,262 B2* | 10/2015 | Lu | .......................... | H02J 7/0031 |
| 2007/0223217 A1* | 9/2007 | Hsu | ........................ | F21S 6/001 362/183 |
| 2010/0261360 A1* | 10/2010 | Li | ......................... | H02J 7/0032 439/152 |
| 2012/0329532 A1* | 12/2012 | Ko | ........................ | H04B 1/3888 455/573 |
| 2013/0016484 A1* | 1/2013 | Yoo | ....................... | H05K 9/0028 361/752 |
| 2014/0315406 A1* | 10/2014 | Pocrass | ................... | H01R 24/64 439/217 |
| 2015/0171564 A1* | 6/2015 | Hsu | ....................... | H01R 13/665 439/620.22 |
| 2015/0193023 A1* | 7/2015 | Odgers | ............... | G06F 3/03543 345/163 |

\* cited by examiner

*Primary Examiner* — Chandrika Prasad
(74) *Attorney, Agent, or Firm* — Lin & Associates Intellectual Property, Inc.

(57) ABSTRACT

A charging connector includes: a main body defining a contact surface; at least one magnetic unit disposed inside the main body; a circuit board disposed in the main body, wherein the magnetic unit is located adjacent to the contact surface of the main body; and two metal coupling members disposed within the main body for electrically coupled with the circuit board in such a manner that a specific section of the metal coupling members is exposed to an exterior of the contact surface of the main body.

4 Claims, 6 Drawing Sheets

CHARGING CONNECTOR HAVING A BODY WITH A MAGNETIC MEMBER

BACKGROUND OF THE INVENTION

The present invention relates generally to a charging connector field, and more particularly to a charging connector that can quickly and securely couple with an electronic device without a connection wire for charging the electronic device, like a mobile phone, when the latter runs out of power.

BACKGROUND ART DISCUSSION

Due to advance of electronic technology, a mobile phone becomes a prevalent communication device for people of nowadays. The more application programs are configured to the mobile phone, the favor the people attractions to the mobile phones for carrying along with them, since a mobile phone can serve as navigation guide, communicate with near and faraway people, playing audio-and-video programs, TV games and etc. The more the functions are attached to the mobile phones, the shorter the power survives for the mobile phone. Hence, more or frequent charging of the mobile phone is needed.

At present, a connection cord is required for charging the mobile phone and a charging connector is used for coupling with the mobile phone. It is inconvenient for the phone user to plug in and/or unplug the connection cord with the mobile phone whenever a charging operation is required to be conducted. Therefore, the prevent inventor intends to provide an alternative way of electrical connection design such that two electronic devices can be quickly connected and/or disconnected relative to each other for charging performance and/or after the charging performance.

SUMMARY OF THE INVENTION

A primary objective of the present invention is to provide a charging connector which utilizes magnetic power to couple two electronic devices interactively and which applies metal coupling members for serving a power transferring interface such that an alternative form of electrical connection is formed to quickly and securely connect and/or disconnect the two electronic devices relative to each other for charging performance and/or after the charging performance.

A charging connector of the present invention includes: a main body defining a contact surface; at least one magnetic unit disposed inside the main body; a circuit board disposed in the main body, wherein the magnetic unit is located adjacent to the contact surface of the main body; and two metal coupling members disposed within the main body for electrically coupled with the circuit board in such a manner that a specific section of the metal coupling members is exposed to an exterior of the contact surface of the main body. Since the specific section of the metal coupling members provides quickly and securely couple with an electronic device without a connection wire for charging the electronic device, like a mobile phone, when the latter runs out of power, thereby facilitating the phone user.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
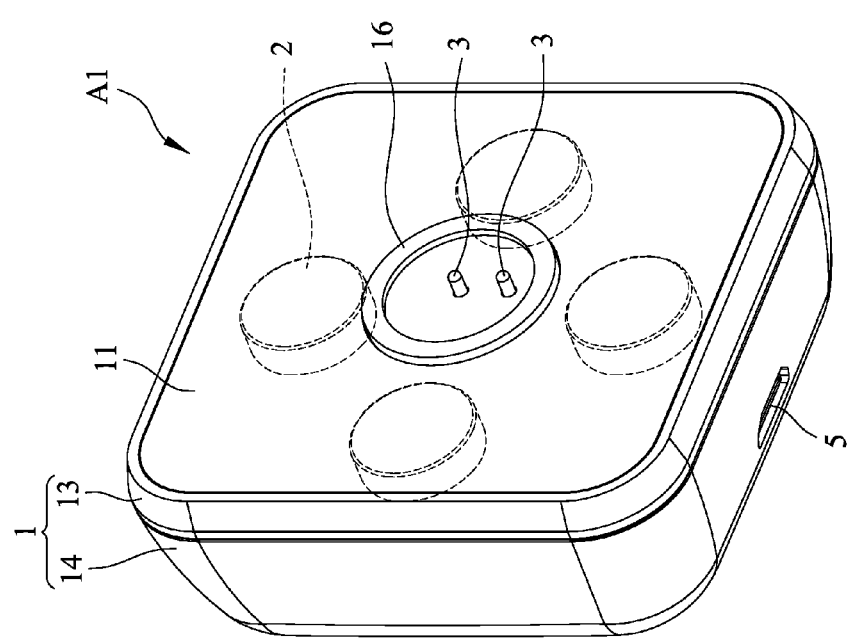
FIG. 1 is a perspective view of a charging connector according to a first embodiment of the present invention.

FIG. 1 is a perspective view of a charging connector according to a first embodiment of the present invention. The charging connector A1 of the present invention serves as a connecting interface which provides quick and secure coupling with an electronic device without a connection wire for charging the electronic device and/or quick disconnection after the charging performance so as to facilitate the mobile phone user. Of course, the charging connector A1 of the present invention is adapted to be applied with different fixtures or suction devices in order to erectly support the same under different circumstances.

Figure 2:
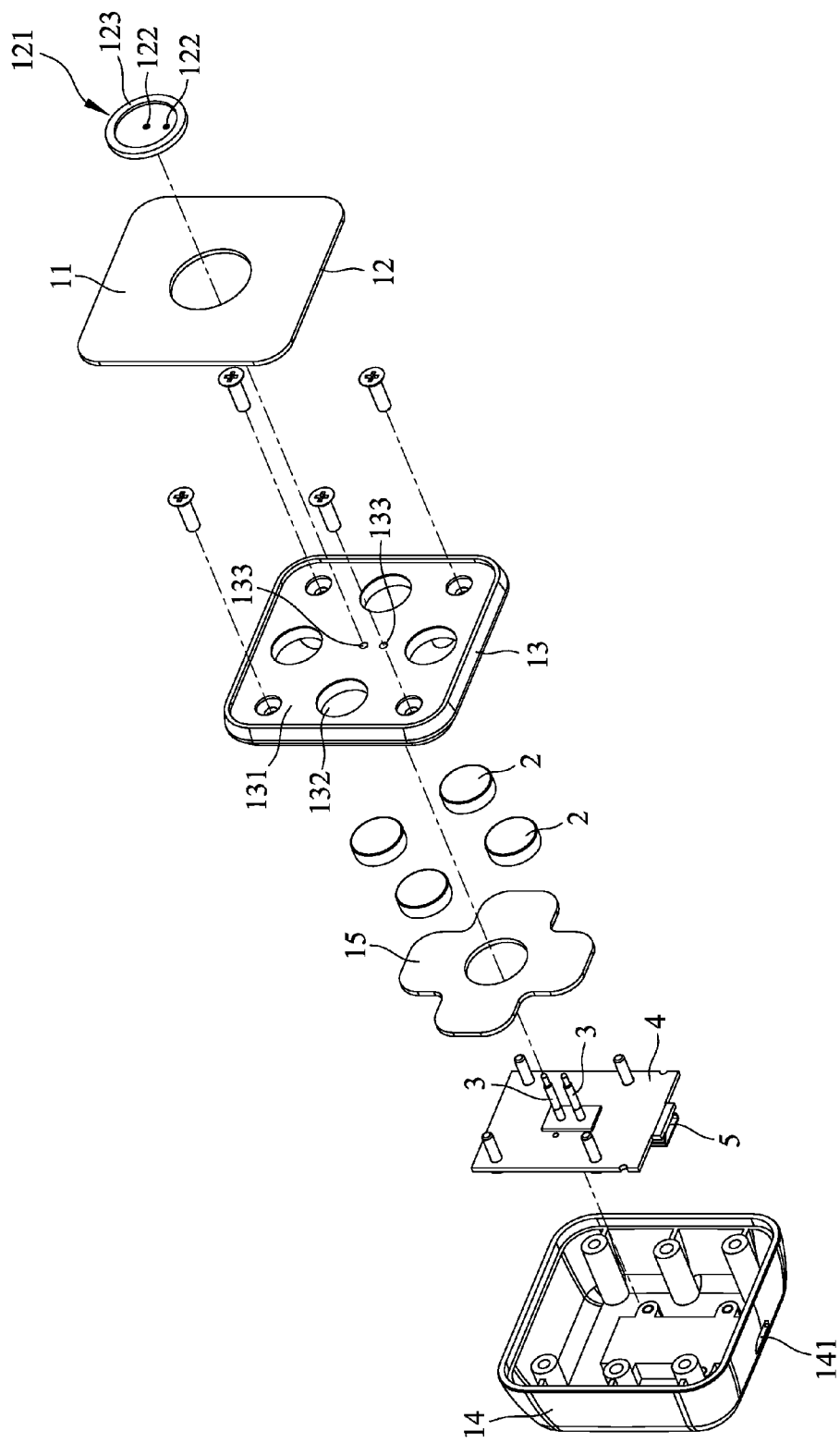
FIG. 2 is a perspective and exploded view of the charging connector according to the first embodiment of the present invention.

Referring to FIGS. 1 and 2, wherein FIG. 1 is a perspective view of a charging connector according to a first embodiment of the present invention and FIG. 2 is a perspective and exploded view of the charging connector according to the first embodiment of the present invention. The charging connector A1 of the present invention includes a main body 1, at least one magnetic unit 2, two metal coupling members 3 and a circuit board 4. The main body 1 defines a contact surface 11. The magnetic unit 2 and the circuit board 4 are disposed inside the main body 1, wherein the magnetic unit 2 is located adjacent to the contact surface 11 of the main body 1. The two metal coupling members 3 are disposed within the main body 1 for electrically coupled with the circuit board 4 in such a manner that a specific section of the metal coupling members 3 is exposed to an exterior of the contact surface 11 of the main body 1. The charging connector A1 of the present invention further includes a power source connector 5 in form of a socket for electrically coupling with the circuit board 4 for supply of electrical power, a plug of a connection cord (not visible) can be inserted into the socket of the main body 1 in order to supply electrical power from the wall socket to the charging connector A1 of the present invention.

The main body 1 in fact is a hollow body defining a space to receive components therein, but should not be limited only thereto, should have a flat contact surface 11 for serving as charging interface so that an electronic device (like a mobile phone) to be charged can be attached thereon. To be more specific, the main body 1 is constituted by a first casing half 13 and a second casing half 14 coupled to the first casing half 13 to form a rectangle, wherein the first casing half 13 is generally flat to define at least one receiving chamber 132 to receive the magnetic unit 2 therein and two pin holes 133. The charging connector A1 of the present invention further includes a cover shield 12 that is fabricated from flexible material, that is disposed on the first casing half 13 to cover the magnetic unit 2 underneath and that has an external surface defining the contact face 11. In addition, a protection shield 15 of generally cross-shaped is disposed adhesively corresponding to the magnetic unit 2 between the first and second casing halves 13, 14.

It is to note that the protection shield 15 defines a central hole in which a rigid positioning element 121 is disposed such that the rigid positioning element 121 is exposed from and protrudes outwardly from a central portion of the contact surface 11 of the main body 1. The rigid positioning element 121 is formed with two through holes 122 to permit extension of and exposing the specific section of the metal coupling members 3 to the exterior of the contact surface 11 of the main body 1 and has an annular restriction flange 123 disposed concentrically around the two through holes 122 such that the annular restriction flange 123 is exposed outwardly from the contact surface 11.

The metal coupling members 3 in fact are metal terminals having two interior ends coupled electrically with the circuit board 4 and two exterior ends extending through two pin holes 133 in the first casing half 13 and the through holes 122 of the rigid positioning element 121 so as to expose exterior of the contact surface 11. The circuit boar 4 has the corresponding control circuit paths (not visible) to maintain and/or control the charging operation function. In this embodiment, the power source connector 5 is installed on the circuit board 4 while the second casing half 14 is formed with a socket 141 configured with the power source connector 5. In actual operation, a power supply cord (a connection cord) is used for coupling the power source connector 5 and a wall socket for power transmission the metal terminals 3.

Figure 3:
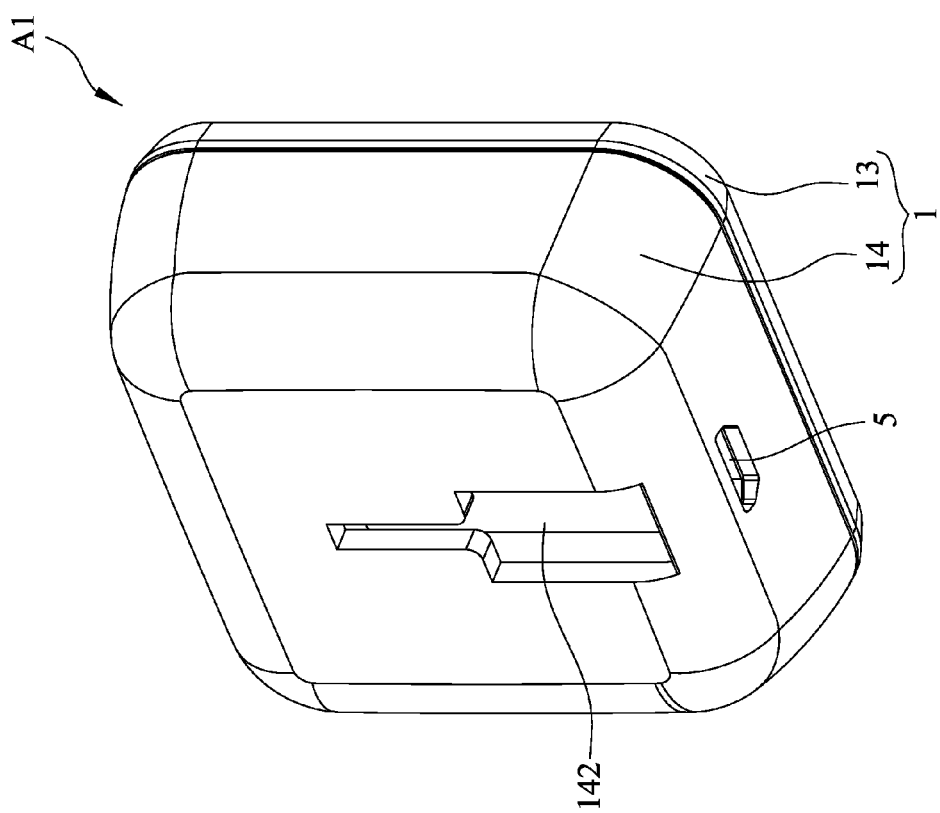
FIG. 3 is a perspective view of the charging connector according to the first embodiment of the present invention from another angle.
Figure 4:
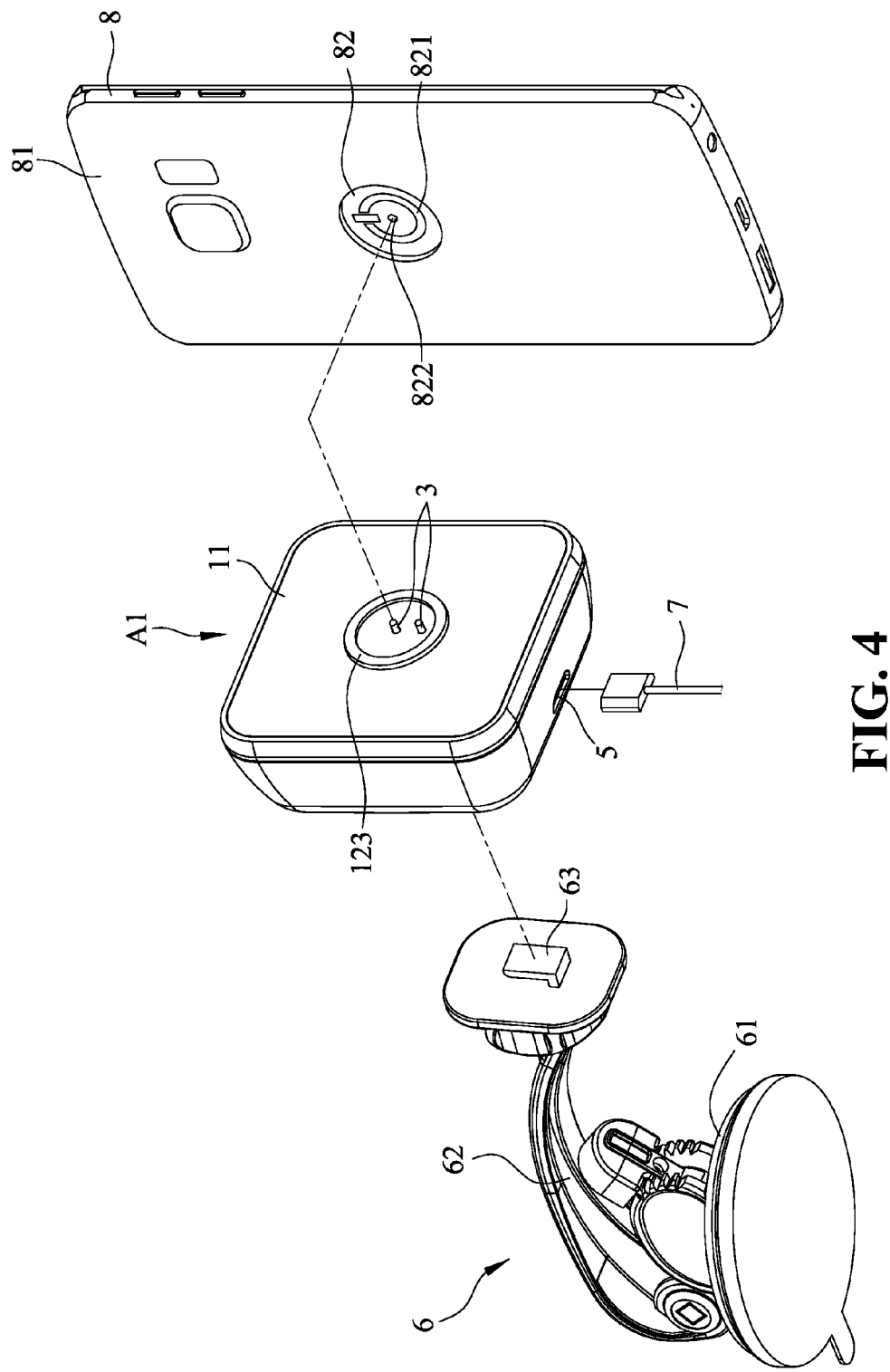
FIG. 4 is a perspective view of the charging connector according to the first embodiment of the present invention in application.

The charging connector A1 of the present invention is intended for serving as charging interface, upon which an electronic device to be charged can be disposed thereon. The charging connector A1 of the present invention can be installed on different supports under different circumstance. As best illustrated in FIG. 4, the charging connector A1 is mounted on a suction device 6, which includes a suction cup 61, an adjustable arm 62 mounted on the suction cup 61 and provided with an engagement hook 63. As illustrated in FIG. 3, the exterior surface of the second casing half 14 is formed with an engagement recess 142 to permit engagement of the hook 63 so that the charging connector A1 is mounted on the suction device 6. Attention is drawn that the suction device 6 is used for demonstration only; the application thereof should not be limited only thereto.

When it is desired to charge an electronic device which power has run out, a connection cord 7 can be applied which has one end connected to the power source connector 5 of the main body 1 while the other end is connected to an external power source (like a wall socket). In this embodiment, a mobile phone 8 is to be charged and is configured to be charged by the charging connector A1 of the present invention. The mobile phone 8 has a metal rear casing 81, which has a central portion dented to form an annular recess 82 via which first and second electrodes 821, 822 are exposed. Note that the first and second electrodes 821, 822 are not connected to each other. Of course, the mobile phone 8 is configured with corresponding circuit paths compatible with the first and second electrodes 821, 822. The annular recess 82 is matched with the annular restriction flange 123 of the charging connector A1 of the present invention such that when the mobile phone 8 has run out of power, one only needs to bring the mobile phone 8 adjacent to the charging connector A1, where the magnet unit 2 will attract the metal rear casing 81 so that the annular restriction flange 123 extends into the annular recess 82 in the metal rear casing 81, thereby establishing electrical contact between the metal terminals 3 and the two electrodes 821, 822 and performing the charging function. Once the charging operation is completed, the mobile phone user can easily remove the mobile phone 8 from the charging connector A1 by simply applying a slight force against the magnetic attraction of the magnetic unit 2.

Figure 5:
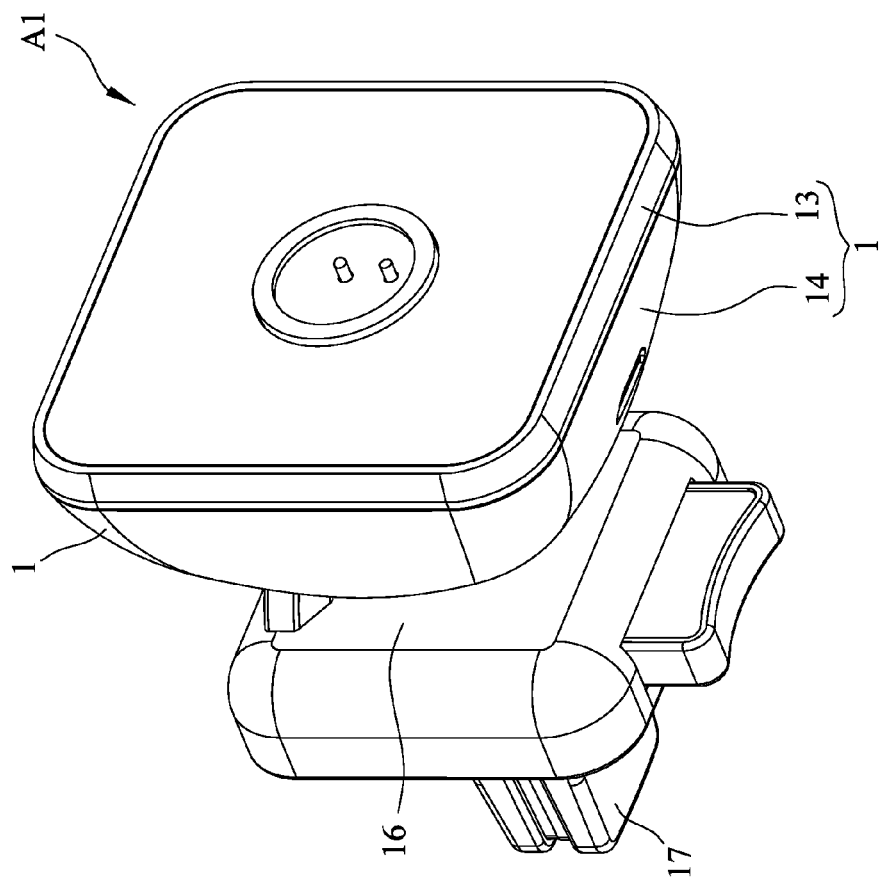
FIG. 5 is a perspective view of a charging connector according to a second embodiment of the present invention.
Figure 6:
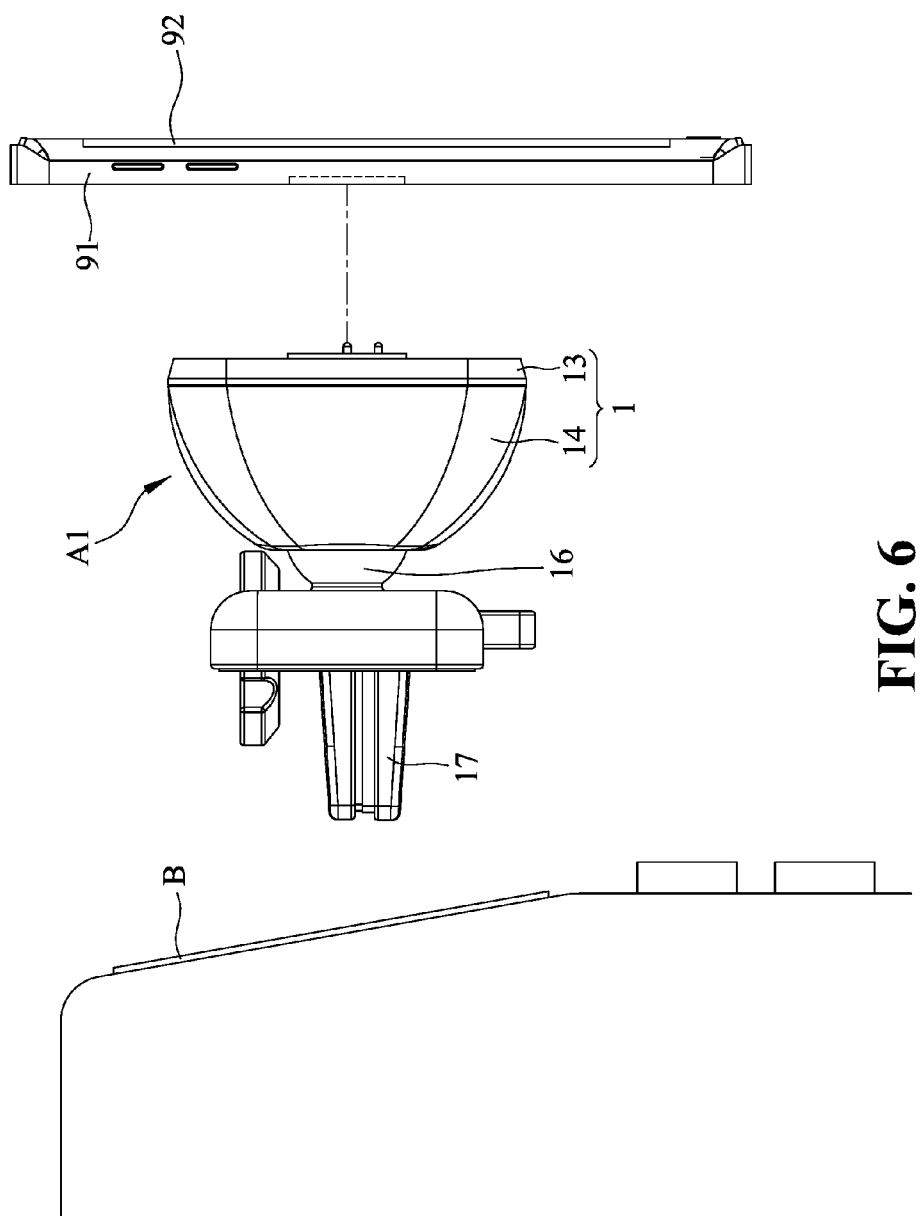
FIG. 6 is a lateral side view of the charging connector according to the second embodiment of the present invention.

FIG. 5 is a perspective view of a charging connector A1 according to a second embodiment of the present invention while FIG. 6 is a lateral side view of the charging connector A1 according to the second embodiment of the present invention. The second embodiment is generally similar to the first embodiment, except in that the charging connector A1 according to the second embodiment further includes a pivot structure 16 which is connected to the second casing half 14 and a ventilation clamp 17, which is adapted to clamp onto a ventilation window B in a vehicle (not shown) so that the location position of the charging connector A1 can adjusted relative to the ventilation window B, when the charging connector A1 of the present invention applied in the vehicle. Under this condition, the charging connector A1 of the present invention serves as charging interface. In order to compatible with the charging connector A1, the mobile phone 92 to be charged is provided with a protection case 91, which has a metal rear cover with electrodes exposing from an annular recess. Of course the protection case 91 is provided with corresponding circuit paths for establishing electrical communication with the mobile phone 92. In normal condition, the mobile phone 92 is placed in the protection case 91 such the power source connector of the mobile phone establishes electrical communication with the electrodes. When it is desired to charge the mobile phone 92 which power has run out, the phone user only needs to place the protection case 91 in contact with the charging connector A1 of the present invention, thereby providing convenient to the phone user. Since the charging operation is the same as the first embodiment, a detailed description is herein omitted for the same of brevity. Note that the pivot structure 16 and the ventilation clamp 17 should not be limited only thereto.

Hence, the charging connector A1 of the present invention provides another form of charging interface without the requirement of frequent plugging and unplugging of conventional connection cord with the mobile phone and the charging connector of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A charging connector comprising:
   a main body defining a contact surface;
   at least one magnetic unit disposed inside the main body;
   a circuit board disposed in the main body, wherein the magnetic unit is located adjacent to the contact surface of the main body; and two metal coupling members disposed within the main body for electrically coupled with the circuit board in such a manner that a specific section of the metal coupling members is exposed to an exterior of the contact surface of the main body.

2. The charging connector according to claim 1, further comprising a power source connector in form of a socket for electrically coupling with the circuit board.

3. The charging connector according to claim 1, further comprising a rigid positioning element that is disposed on a central portion of the contact surface of the main body, that is formed with two through holes to permit extension of and exposing the specific section of the metal coupling members to the exterior of the contact surface of the main body and that has an annular restriction flange concentrically disposed around the two through holes.

4. The charging connector according to claim 2, wherein the main body is constituted by a first casing half and a second casing half coupled to the first casing half to form a rectangle, wherein the first casing half is generally flat to define at least one receiving chamber to receive the at least one magnetic unit therein and two pin holes, the charging connector further comprising a cover shield that is fabricated from flexible material, that is disposed on the first casing half to cover the at least one magnetic unit underneath and that defines the contact face.

\* \* \* \* \*